:::

3,576,774
MODIFICATION OF POLYESTERS WITH CYCLIC
TRIS(ETHYLENE TEREPHTHALATE)
Richard E. Myers, Akron, and Jack D. Hauenstein, Stow, Ohio, assignors to The Goodyear Tire & Rubbber Company, Akron, Ohio
No Drawing. Filed Oct. 27, 1969, Ser. No. 869,874
Int. Cl. C08g *17/14*
U.S. Cl. 260—22      10 Claims

ABSTRACT OF THE DISCLOSURE

Polyethylene terephthalate is increased in molecular weight by treating the same after polycondensation with 1 to 50 weight percent of cyclic tris(ethylene terephthalate).

---

This invention relates to the elevation of molecular weight (or intrinsic viscosity) of poly(ethylene terephthalate). More particularly the present invention relates to treating polymers of ethylene terephthalate and copolymers thereof at an elevated temperature of about 250° to 300° C. with about 1 to 50 percent by weight (preferably about 2 to 35 weight percent) of cyclic tris(ethylene terephthalate).

The polyesters useful in accordance with the present invention are cold-drawing, linear, highly polymerized esters of terephthalic acid and glycols of the formula $HO(CH_2)_nOH$, where $n$ is an integer of from 2 to 10. The copolyesters used in this invention may comprise ethylene terephthalate-ethylene isophthalate copolyesters as more fully described hereinafter.

In producing polyalkylene terephthalates there is involved the interaction of at least two molecular proportions of a glycol (preferably ethylene glycol) per molecular proportion of terephthalic acid with the splitting out of water. Subsequent heating of the resulting glycol ester of terephthalic acid at about 250° to 280° C. under 0.05 to 20 millimeters of mercury pressure absolute results in the production of high polymer with the splitting out of glycol which is removed from the reaction mixture.

Highly polymeric polyalkylene terephthalates, useful for the purpose of the invention, may also be produced as hereinbefore mentioned by heating terephthalic acid bodies, such as ester forming derivatives of terephthalic acid with at least one glycol. Suitable ester forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this procedure first there is a transesterification reaction (or ester interchange reaction) to low polymer at about 150° to 250° C. for 0.5 to 3.0 hours with the evolution of alcohol. Subsequently, upon heating at about 250° to 280° C. under 0.05 to 20 millimeters of mercury absolute pressure there is a polycondensation reaction for 0.2 to 8.0 hours to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is also within the scope of the invention and is along lines previously described. It is described in detail in U.S. Pat. 2,965,613 to Milone et al.

Other linear aromatic polyester resins useful for the purposes of the invention include, among others, not only polyethylene terephthalate and copolyesters of ethylene terephthalate and ethylene isophthalate, but also such polyesters as those of cyclohexane dimethylol terephthalate, polyethylene-2,6-naphthalate and copolyesters of terephthalic acid which contain at least 75 mole percent of terephthalic acid. Also copolyesters may be derived from a glycol, terephthalic acid and dimer acid as disclosed in U.S. Pat. No. 3,390,108 to Keck et al.

In order to more fully illustrate the present invention, the following experimental data are given:

EXAMPLE 1

A mixture of 15.5 grams of poly(ethylene terephthalate) having an intrinsic viscosity of 0.94 and 0.77 gram (5% by weight) of cyclic tris(ethylene terephthalate) was placed in a glass tube. In another tube was placed a control sample of 15.5 grams of poly(ethylene terephthalate). The tubes were placed in an oven at 60° C. and dried in vacuo for 50 hours. After drying the vacuum was relieved by dry nitrogen and the oven temperature raised to 280° C. The samples were kept at 280° C. at atmospheric pressure under a dry nitrogen blanket for 2 hours. At the end of two hours, the samples were cooled to room temperature then ground and the intrinsic viscosity was determined. The intrinsic viscosity of the control sample was 0.83 and the intrinsic viscosity of the experimental sample was 0.85.

EXAMPLE 2

Sixteen (16.0) grams of poly(ethylene terephthalate) having an intrinsic viscosity of 0.65 and 1.6 grams (10% by weight) of cyclic tris(ethylene terephthalate) were placed in a test tube. A control sample was also prepared. The experiment was conducted as in Example #1. The intrinsic viscosity of the control was 0.59. The intrinsic viscosity of the experimental sample was 0.60.

Cyclic tris ethylene terephthalate is

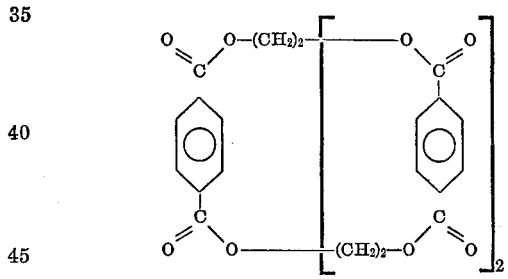

Resort may be had to modification and variations of the disclosed embodiments of the invention without departing from the spirit of the invention or the scope of the appended claims.

What is claimed is:

1. The process which comprises reacting cyclic tris (ethylene terephthalate) with molten poly(ethylene terephthalate) at a temperature of from about the melting temperature of said poly(ethylene terephthalate) up to about 300° C.

2. The process which comprises reacting cyclic tris (ethylene terephthalate) with a copolyester of ethylene terephthalate and ethylene isophthalate at a temperature of from about the melting temperature of said copolyester up to about 300° C.

3. The reaction product of molten poly(ethylene terephthalate) with a minor proportion of cyclic tris(ethylene terephthalate).

4. The reaction product of cyclic tris(ethylene terephthalate) with a copolyester derived from at least one glycol, terephthalate acid and a dimer acid.

5. The reaction product of molten poly(ethylene terephthalate) and a minor proportion of poly(1,4-cyclohexane dimethylene) terephthalate.

6. A process for producing a polyester of elevated molecular weight which comprises reacting molten poly (ethylene terephthalate) at a temperature of about 280° to 295° C. for about 0.5 to 100 minutes with a minor proportion of cyclic tris(ethylene terephthalate).

7. A process in accordance with claim 6 in which the reaction takes place after polycondensation.

8. A process for increasing the molecular weight of a copolyester of ethylene terephthalate and ethylene isophthalate which comprises reacting said copolyester in molten form with a minor proportion of cyclic tris(ethylene terephthalate).

9. A process for increasing the molecular weight of a copolyester derived from at least one glycol, terephthalic acid and a dimer acid which comprises reacting said copolyester at a temperature between the melting point of the polymer and 300° C. for about 0.5 to 100 minutes with a minor proportion of cyclic tris(ethylene terephthalate).

10. A process for increasing the molecular weight of poly(1,4-cyclohexane dimethylene) terephthalate which comprises reacting said poly(1,4-cyclohexane dimethylene) terephthalate in molten form with a minor proportion of cyclic tris(ethylene terephthalate) at a temperature between the melting temperature of poly(cyclohexane dimethylene) terephthalate and 300° C.

References Cited
UNITED STATES PATENTS 3,390,108   6/1968   Keck et al. _____ 260—7.5

HOSEA E. TAYLOR, Primary Examiner

R. W. GRIFFIN, Assistant Examiner

U.S. Cl. X.R.

260—75